(12) United States Patent
Charest et al.

(10) Patent No.: US 8,905,118 B2
(45) Date of Patent: Dec. 9, 2014

(54) BI-METALLIC COMPONENT AND METHOD OF MAKING THE SAME

(75) Inventors: Pascal P. Charest, Caledon East (CA); Eric deNijs, Etobicoke, CA (US)

(73) Assignee: Magna International Inc., Aurora, Ontario (CA)

( * ) Notice: Subject to any disclaimer, the term of this patent is extended or adjusted under 35 U.S.C. 154(b) by 94 days.

(21) Appl. No.: 13/574,330

(22) PCT Filed: Jan. 20, 2011

(86) PCT No.: PCT/CA2011/000060
§ 371 (c)(1),
(2), (4) Date: Sep. 11, 2012

(87) PCT Pub. No.: WO2011/088554
PCT Pub. Date: Jul. 28, 2012

(65) Prior Publication Data
US 2013/0009390 A1  Jan. 10, 2013

Related U.S. Application Data

(60) Provisional application No. 61/296,727, filed on Jan. 20, 2010.

(51) Int. Cl.
*B22D 19/04* (2006.01)
*B22D 19/16* (2006.01)
*B62D 21/11* (2006.01)
*B22D 19/00* (2006.01)
*B60G 21/05* (2006.01)

(52) U.S. Cl.
CPC ............ *B62D 21/11* (2013.01); *B60G 2206/20* (2013.01); *G60G 7/001* (2013.01); *B60G 2206/10* (2013.01); *B22D 19/00* (2013.01); *B60G 21/051* (2013.01); *B60G 2206/70* (2013.01)
USPC ............................ 164/111; 164/112; 164/137

(58) Field of Classification Search
USPC ............................ 164/98, 100, 111, 112, 137
See application file for complete search history.

(56) References Cited

U.S. PATENT DOCUMENTS

| | | | |
|---|---|---|---|
| 7,806,162 B2 * | 10/2010 | Kotagiri et al. | 164/111 |
| 7,837,230 B2 | 11/2010 | Mellis et al. | |
| 2008/0265626 A1 * | 10/2008 | Dorr et al. | 296/204 |
| 2009/0134594 A1 | 5/2009 | Kiselis et al. | |
| 2011/0068619 A1 | 3/2011 | Werner et al. | |

FOREIGN PATENT DOCUMENTS

| | | |
|---|---|---|
| DE | 20319147 U1 | 4/2004 |
| JP | 2004344955 A | 12/2004 |
| WO | 2006122423 A1 | 11/2006 |
| WO | 2008004715 A1 | 1/2008 |

* cited by examiner

Primary Examiner — Kevin P Kerns
(74) Attorney, Agent, or Firm — Dickinson Wright PLLC

(57) ABSTRACT

In one aspect, the invention is directed to a half-cradle for use in a vehicle frame. The half-cradle includes a cast end member formed from a first material and first and second tubular cross-member stubs extending from the cast end member. The first and second tubular cross-member stubs are made from a second material. Each of the stubs has an end buried in the cast end member, wherein the buried end is uncapped. Each of the tubular cross-member stubs has an interior that is configured to sealingly receive a core for use in preventing the filling of the stub with molten first material during casting of the cast end member.

11 Claims, 13 Drawing Sheets

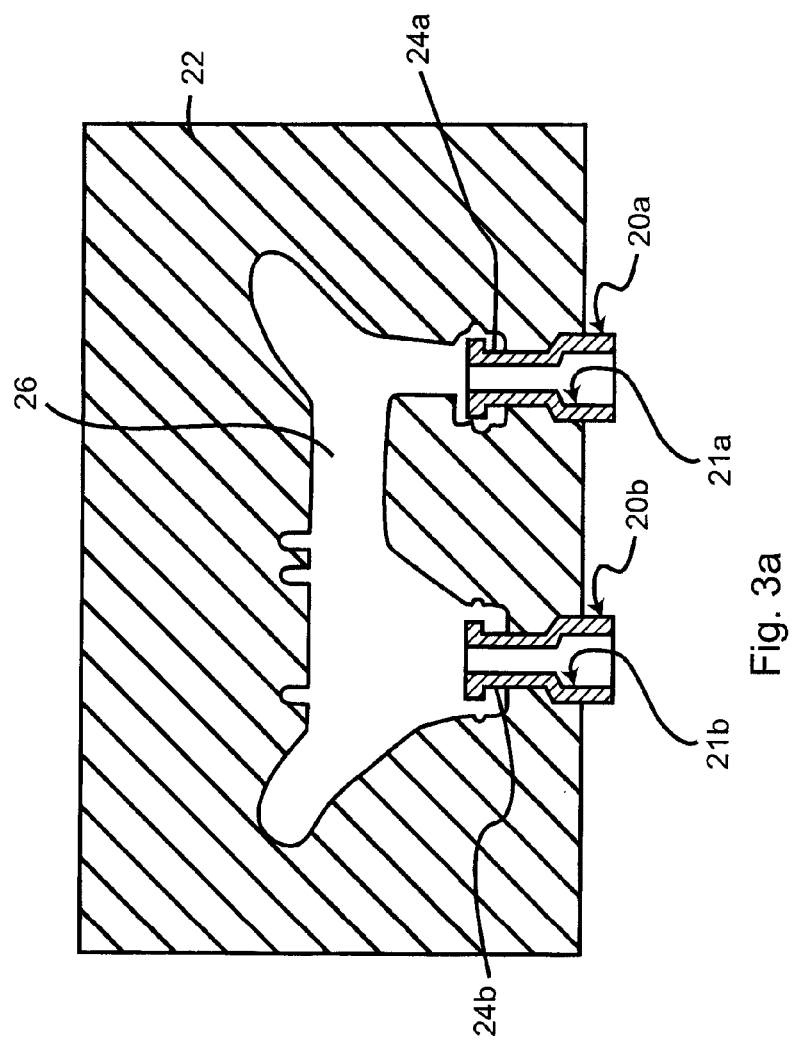

BI-METALLIC COMPONENT AND METHOD OF MAKING THE SAME

CROSS REFERENCE TO RELATED APPLICATIONS

This U.S. National Stage patent application claims priority to International Patent Application Serial No. PCT/CA2011/000060 filed on Jan. 20, 2011, entitled "Bi-Metallic Component And Method Of Making The Same" and U.S. Provisional Patent Application No. 61/296,727 filed on Jan. 20, 2010, the entire disclosures of all of these applications being considered part of the disclosure of this application and are hereby incorporated by reference.

FIELD OF THE INVENTION

The instant invention relates generally to components for use in automotive applications, such as for instance automotive engine cradles, frames and suspensions, or to components for use in non-automotive applications, and more particularly to bi-metallic components that are formed by joining together at least two parts that are fabricated from different materials, such as for instance steel and aluminum.

BACKGROUND OF THE INVENTION

A wide variety of components for automotive and non-automotive applications are now being fabricated using a process in which one part is cast around a portion of another part. In some cases, the different parts of the component are fabricated using different materials, so as to provide a finished component with desired weight and/or strength characteristics. By way of a few specific and non-limiting examples, an engine cradle is formed by casting aluminum end members around the ends of hollow, steel cross-members, or a torsion beam axle assembly is formed by casting an aluminum trailing arm around an end portion of a steel torsion beam, as described for instance in U.S. Pat. Nos. 7,837,230 and 8,496,258.

A typical process for manufacturing an engine cradle includes covering the open ends of each of the hollow, steel cross-members with an end cap. The covered ends of the steel cross-members are then introduced into a mold of predetermined shape and are held in place. Molten aluminum is introduced into the mold at relatively high pressure and is cooled, so as to cast an end member around the ends of each of the cross-members. The purpose of the end caps primarily is to prevent the molten aluminum from entering and filling the cross-member during the casting process. In order to ensure that the molten aluminum does not enter the hollow cross-member during the casting process, typically the entire length of the mating seam between the end cap and the cross-member is welded. Once the casting step has taken place, an X-ray scan of the casting is carried out in order to verify whether there are any defects in the castings.

Of course, the end caps that are used to cover the ends of the cross-members add weight to the cradle, which results in higher unit costs and leads to lower fuel efficiency in the finished automobile. Further, the end caps are sometimes deformed under the influence of the high pressure that is exerted during the casting process. Further still, the presence of the end caps can create air pockets during an e-coating step, and it may be relatively difficult to drain the excess e-coat from the cross-members since the ends of the cross-members necessarily have no holes.

Another disadvantage of this process is that the ends of the cross-members typically are formed into a cylindrical shape, and they are covered using circularly shaped end caps in order to create a pressure vessel that is able to withstand the pressure exerted by the molten aluminum in the mold. Of course, a cylindrical shape is not necessarily an optimal shape for supporting a load during use.

Additionally, transporting, handling and storing of completed cradles can be cumbersome because of the weight of the completed cradle and also because of its size. Often, specialized equipment is required during handling and transporting of the completed cradles. Furthermore, the completed cradles occupy a relatively large amount of space even though each cradle has a large amount of empty space associated therewith. Of course, in the event that an X-ray scan reveals a defect in one of the two castings in a finished cradle, it is necessary to scrap the entire cradle even if the other casting in the cradle has no defects. This can result in a scrap rate for cradles as high as 10% in some cases.

Other components may be manufactured in a similar way, such as for instance torsion beam axle assemblies, control arms, etc. For instance, each end of a steel torsion beam is covered with an end cap as described above, and each end of the torsion beam is introduced into a mold. Molten aluminum is introduced into each mold at relatively high pressure and is cooled, so that a trailing arm is cast around the each end of the torsion beam. Torsion beams, or control arms, that are formed in this manner also suffer the above-noted disadvantages.

In WO 2008/004715, Ko proposes an alternative arrangement for a torsion beam axle. In particular, the torsion beam axle includes a torsion beam, a plurality of trailing arms made from a material different than that of the torsion beam, and connecting tubes made of a material better than that of the trailing arms with respect to weldability with the torsion beam, the connecting tubes integrally coupled with the trailing arms at one end thereof. Unfortunately, Ko merely provides a schematic illustration of a finished torsion beam axle assembly in cross-sectional view, in which the material of the trailing arm surrounds the one end of the connecting tube and extends through anchoring-slots at the one end of the connecting tube. In this rather fanciful disclosure, Ko neither suggests a suitable process for fabricating the finished torsion beam axle, nor does Ko even appear to contemplate the difficulties that are associated with casting the trailing arm around the one end of the hollow connecting tube. As such, it appears that Ko intended for it to be left entirely to the reader to devise a suitable process for forming the torsion beam axle assembly. Such a process must prevent molten material, which is used to form the trailing arm, from being ejected under pressure from the mold via the hollow connecting tube. In addition, such a process must also prevent filling of the connecting tube by the solidified trailing arm material in the finished product. Of course, this leaves it to the reader to solve a significant problem, requiring simultaneous consideration of complex engineering issues as well as safety issues, manufacturing process issues and economic issues.

It would therefore be desirable to provide a bi-metallic component, such as for instance an engine cradle, a torsion beam axle assembly or a control arm, and a process for manufacturing the same, which overcomes at least some of the above-noted disadvantages.

SUMMARY OF EMBODIMENTS OF THE INVENTION

In one aspect, the invention is directed to a bi-metallic joint made up of a first member and a second member. The first member is cast around at least a portion of the second member. The first member is made from a first material, such as for instance aluminum, magnesium, zinc, etc., or alloys thereof. The second member is made from a second material, such as for instance steel, aluminum, copper, stainless steel, etc., or alloys thereof. The melting temperature of the first material is lower than, or may even be approximately equal to, the melting temperature of the second material, thereby permitting the first member to be cast around the second member.

To form the bi-metallic joint, a portion (e.g., an end) of the second member is positioned in a mold and held in place. Molten first material is introduced into the mold and is solidified around the portion of the second member in the mold. In embodiments wherein the second member is tubular, it may be provided with an end cap at the end that is in the mold to prevent molten first material from escaping from the mold through the end of the second member. In some embodiments, wherein an end cap is provided, the portion of the second member in the mold and the end cap may be configured to withstand the pressures of the molten first material in the mold. Alternatively, the end cap and the portion of the second member in the mold may not be configured to withstand the pressures in the mold by themselves. Instead a removable core member may be inserted into the interior of the second member and abutted with the end cap so that the core supports the second member and the end cap. In this way, the core prevents deformation of the second member and of the end cap, or at least prevents significant deformation of the second member and of the end cap. In some embodiments, the end cap is omitted entirely and a core is inserted into the interior of the second member both to support the second member and to seal against the escape of molten first material from the mold through the end of the second member. The core optionally extends into the mold farther than the second member, or is flush with the end of the second member, or the second member extends into the mold farther then the core.

The second member may be a stub member that is intended to be connected to another member. For example, a cradle may be provided with one or more second members that are stubs that are partially embedded in a cast end member (as shown in FIG. 2). Cross-members, which are made from a compatible material to the stubs, can then be welded to the stubs. For greater certainty, in embodiments wherein a cast first member has a plurality of second members partially embedded therein, it is not necessary that all the second members be made from the same material.

Preferably, the second member has features thereon that prevent slippage between the first and second members during use of the joint. For example, the second member may be generally rectangular in cross-sectional shape (as shown in FIG. 2) to prevent rotation of the first member and second member relative to each other about an axis along the length of the second member. Alternatively, the second member may have a closed profile in cross section that is hexagonal, octagonal, L-shaped etc., to prevent rotation of the first member and second member relative to each other about an axis along the length of the second member. As another example, the second member may have a flange portion thereon to prevent the first and second members from being pulled apart by forces acting on the bi-metallic joint and to prevent rotation of the first and second members relative to one another. Alternatively, the second member may have slots or holes, either with or without hanging flaps of the second material, defined proximate the end of the second member that is positioned in the mold. The molten first material flows through the slots or holes, thereby forming an anchoring and anti-rotation feature when the first material cools and solidifies.

The bi-metallic joint may be used in a number of applications, such as on a torsion beam axle assembly wherein the trailing arm is a first material such as cast aluminum and the torsion beam is a second material such as steel, or on a cradle, such as a rear suspension cradle or an engine cradle wherein the end members are made from cast aluminum and any cross-beams are made from a first material, such as steel. Other applications include use of the bi-metallic joint in an instrument panel support structure, in a bumper assembly and in a control arm.

According to an aspect of an embodiment of the instant invention, there is provided a bi-metallic component, comprising: a cast member formed from a first material; and a tubular stub member formed from a second material and having an open first end and an open second end that is opposite the first end, the cast member cast around the second end, and the first end extending from the cast member, the stub member having an interior surface that is configured to sealingly receive a removable core member for preventing molten first material from flowing through the stub member between the second end and the first end thereof during casting of the cast member around the second end.

According to an aspect of another embodiment of the instant invention, there is provided a half cradle for use in a cradle in a vehicle frame, comprising: a cast end member formed from a first material; and first and second tubular cross-member stubs, each formed from a second material and each having a first end and a second end that is opposite the first end, the cast member cast around the second end of each of the first and second tubular cross-member stubs, and the first end of each of the first and second tubular cross-member stubs extending from the cast member, each of the first and second tubular cross-member stubs having an interior surface that is configured to sealingly receive a removable core member for preventing molten first material from flowing through either one of the first and second tubular cross-member stubs between a respective second end and a respective first end thereof during casting of the cast member.

According to an aspect of another embodiment of the instant invention, there is provided a torsion beam axle assembly, comprising: a cast trailing arm formed from a first material; and a torsion beam stub formed from a second material and having a first end and a second end that is opposite the first end, the cast trailing arm cast around the second end of the torsion beam stub and the first end of the torsion beam stub extending from the cast member, the torsion beam stub having an interior surface that is configured to sealingly receive a removable core member for preventing molten first material from flowing through the torsion beam stub between the second end and the first end thereof during casting of the cast trailing arm around the second end.

According to an aspect of another embodiment of the instant invention, there is provided a control arm, comprising: a cast coupling member formed from a first material; and a tubular stub member formed from a second material and having a first end and a second end that is opposite the first end, the cast coupling member cast around the second end of the tubular stub member and the first end of the tubular stub member extending from the cast coupling member, the tubular stub member having an interior surface that is configured to sealingly receive a removable core member for preventing molten first material from flowing through the tubular stub member between the second end and the first end thereof during casting of the cast coupling member around the second end.

According to an aspect of another embodiment of the instant invention, there is provided a full cradle for use in a vehicle frame, comprising: first and second half-cradles, each one of the first and second half-cradles comprising: a cast end member formed from a first material; and, first and second tubular cross-member stubs formed from a second material, each of the first and second tubular cross-member stubs having an open first end and an open second end that is opposite the first end, the cast end member cast around the second end of each of the first and second tubular cross-member stubs and the first end of each of the first and second tubular cross-member stubs extending from the cast end member, each one of the first and second tubular cross-member stubs having an interior surface that is configured to sealingly receive a removable core member for preventing molten first material from flowing through either one of the first and second tubular cross-member stubs between the respective second end and the respective first end thereof during casting of the cast end member around the second end of each of the first and second tubular cross-member stubs; and, a first cross-member connected between the first tubular cross-member stubs on the first and second half-cradles, and a second cross-member connected between the second tubular cross-member stubs on the first and second half-cradles, wherein the first and second cross-members are made from a material that is weldable to the second material.

According to an aspect of another embodiment of the instant invention, there is provided a method of making a bi-metallic component, comprising: a) providing a first material; b) providing a tubular stub member made from a second material; c) positioning a portion of the tubular stub member in a mold; d) removably inserting a core into the tubular stub member; e) introducing the first material in molten form into the mold around the tubular stub member; f) holding the core in the tubular stub member with a sufficient force to prevent first material from filling the tubular stub member; g) solidifying the first material to form a cast member in the mold around a portion of the tubular stub member, the solidified cast member and the tubular stub member together forming the bi-metallic component; and h) opening the mold to release the bi-metallic component.

According to an aspect of another embodiment of the instant invention, there is provided a method of making a half-cradle for use in a cradle in a vehicle frame, comprising: a) providing a first material; b) providing first and second tubular cross-member stubs made from a second material; c) positioning a portion of each of the first and second tubular cross-member stubs in a mold; d) removably inserting first and second cores into the first and second tubular cross-member stubs, respectively; e) introducing the first material in molten form into the mold around the first and second tubular cross-member stubs; f) holding the first and second cores in the first and second tubular cross-member stubs with a sufficient force to prevent first material from filling the first and second tubular cross-member stubs; g) solidifying the first material to form an end member in the mold around the portion of each of the first and second tubular cross-member stubs, the solidified end member and the first and second tubular cross-member stubs together forming a half-cradle; and h) opening the mold to release the half-cradle.

According to an aspect of another embodiment of the instant invention, there is provided a method of making a full cradle for use in a vehicle frame, comprising: a) making a first half-cradle according to the method described in the previous paragraph; b) making a second half-cradle according to the method described in the previous paragraph; c) connecting a first cross-member to the first tubular cross-member stub on each of the first and second half-cradles; and d) connecting a second cross-member to the second tubular cross-member stub on each of the first and second half-cradles.

According to an aspect of another embodiment of the instant invention, there is provided a method of making a bi-metallic joint, comprising: a) providing a first metal; b) providing a second member made from a second metal, the second member having an end aperture at an end thereof; c) sealing the end aperture with an end cap; d) inserting a core into the second member in abutment with the end and with the end cap; e) positioning the end of the second member in a mold; f) introducing the first metal in molten form into the mold around the end of the second member and the end cap; g) solidifying the first metal to form a first member in the mold around the end of the second member and the end cap; and, h) removing the core from the second member, wherein the end cap and the end of the second member are not sufficiently strong to withstand a pressure in the mold during steps f) and g), and, wherein the core remains in abutment with the end and with the end cap during steps f) and g) and prevents substantial deformation of either the end or the end cap during steps f) and g).

According to an aspect of another embodiment of the instant invention, there is provided a method of making a bi-metallic joint, comprising: a) providing a first metal; b) providing a second member made from a second metal, the second member having an end aperture at an end thereof; c) removably inserting a core into the second member through an open first end thereof, the core configured for substantially forming a seal, during a molding process, between an outer surface thereof and an interior surface of the second member that faces the outer surface of the core; d) positioning an open second end of the second member in a mold, the second open end opposite the first open end; e) introducing the first metal in molten form into the mold around the second open end of the second member; f) solidifying the first metal to form a first member in the mold around the second open end of the second member; and, g) removing the core from the second member.

BRIEF DESCRIPTION OF THE DRAWINGS

The present invention will now be described by way of example only with reference to the attached drawings, wherein similar reference numerals denote similar elements throughout the several views, in which:

FIG. 3a is a cross-sectional view illustrating the casting of an end member around two cross-member stubs, each of the cross-member stubs being shown with one end held in a mold and prior to receiving a core;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein. Any reference in this disclosure to a metal will be understood to encompass both the pure metal and alloys of the metal. For example, references to aluminum are intended to include both pure aluminum and aluminum alloys.

Figure 1:
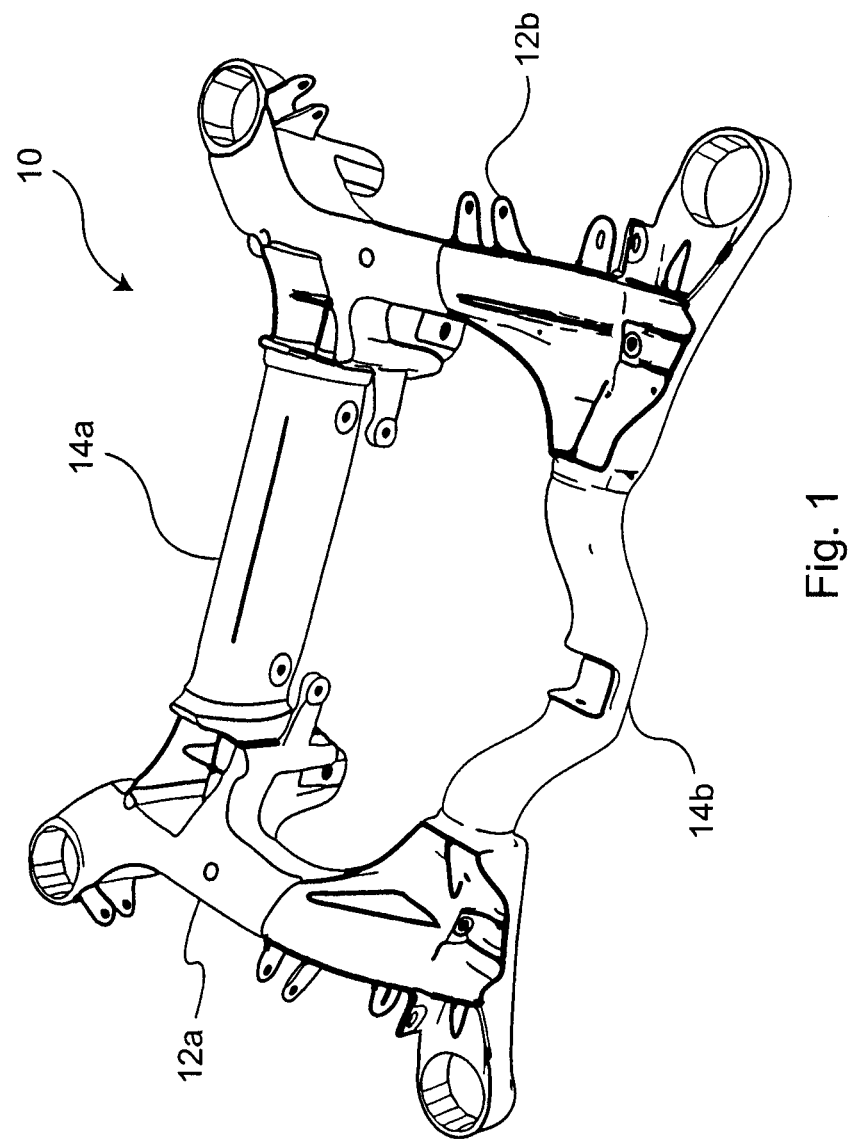
FIG. 1 is a perspective view of a cradle for use in a vehicle frame, in accordance with an embodiment of the instant invention.

Reference is made to FIG. 1, which shows a cradle 10 for use in a vehicle frame in accordance with an embodiment of the instant invention. The cradle 10 includes first and second half-cradles, which are shown individually at 12a and 12b, respectively, and first and second cross-members, which are shown individually at 14a and 14b, respectively. The cradle 10 may further include lower reinforcement bars (not shown).

Figure 2:
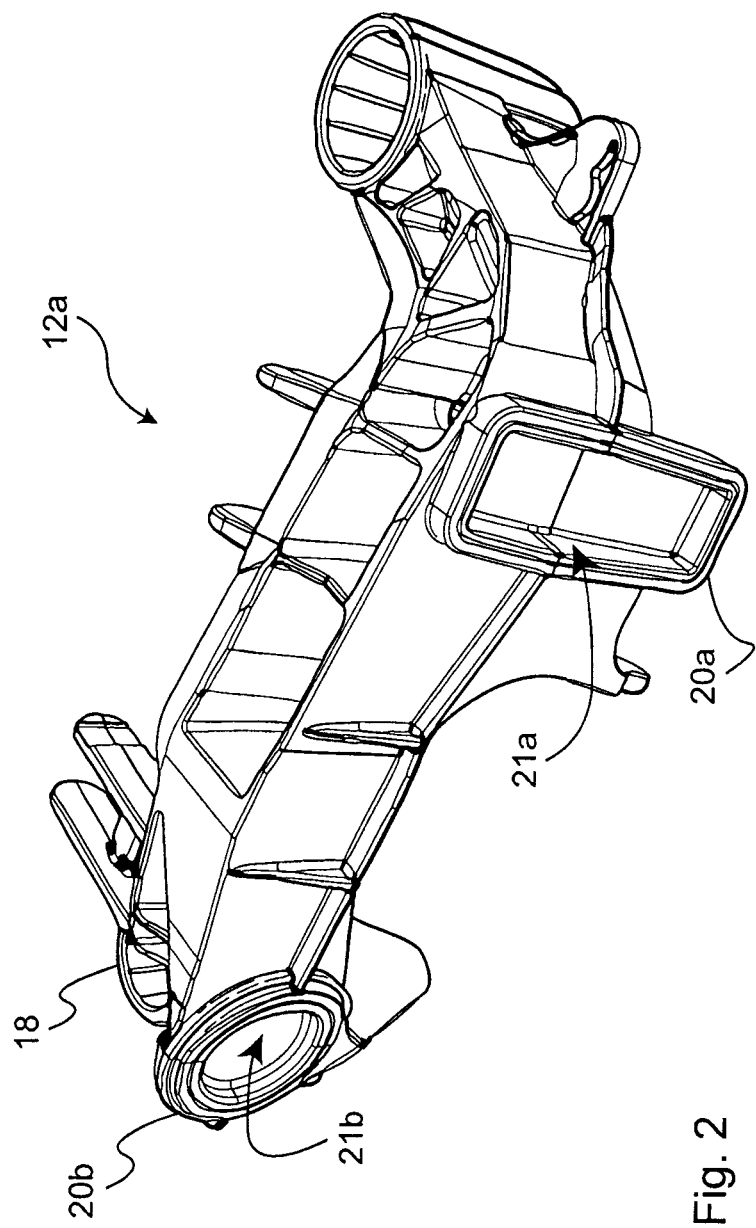
FIG. 2 is a perspective view of a half-cradle that is used in the cradle shown in FIG. 1.

Referring now to FIG. 2, shown is one of the half-cradles 12a of the cradle 10 of FIG. 1. The half-cradle 12a comprises an end member 18 that is made from a first material, such as for instance aluminum or an aluminum alloy, and first and second cross-member stubs, which are shown individually at 20a and 20b, respectively. The first and second cross-member stubs 20a and 20b are made from a second material having a melting temperature that is higher than or approximately equal to the melting temperature of the first material, such as for instance steel. Each of the stubs 20a and 20b is tubular and defines an interior surface 21a and 21b, respectively. As is shown in accordance with this embodiment, the stub 20a is of rectangular cross section and 20b is of circular cross section. Alternatively, other cross-sectional shapes may be employed such as for instance square, oval, hexagonal, octagonal, other polygonal, L-shaped, etc. The stubs 20a and 20b provide a connection surface or connection edge for connecting (e.g., by mechanical, chemical or fusion joint, including welding, riveting, bolting etc.) the cross-members 14a and 14b of FIG. 1. When connecting is achieved by welding, the cross-members 14a and 14b are made from a compatible material (e.g., a material that is weldable to the second material). In one embodiment, the cross-members 14a and 14b are made from the same material that is used to make the stubs 20a and 20b, such as for instance steel.

The half-cradle 12a, and similarly the half cradle 12b, can be manufactured without the need for end caps on the cross-member stubs 20a and 20b. To manufacture the half-cradle 12a, and similarly the half cradle 12b, the cross-member stubs 20a and 20b are introduced into a mold 22, as shown in greater detail in FIG. 3a, such that a respective end 24a and 24b of the stubs 20a and 20b extends into a mold cavity 26 of the mold 22. More specifically, when the mold 22 is open the stubs 20a and 20b are positioned on one of the mold plates. The mold 22 is then closed, and the stubs 20a and 20b are held in place with their respective ends 24a and 24b extending into the mold cavity 26.

Figure 3B:
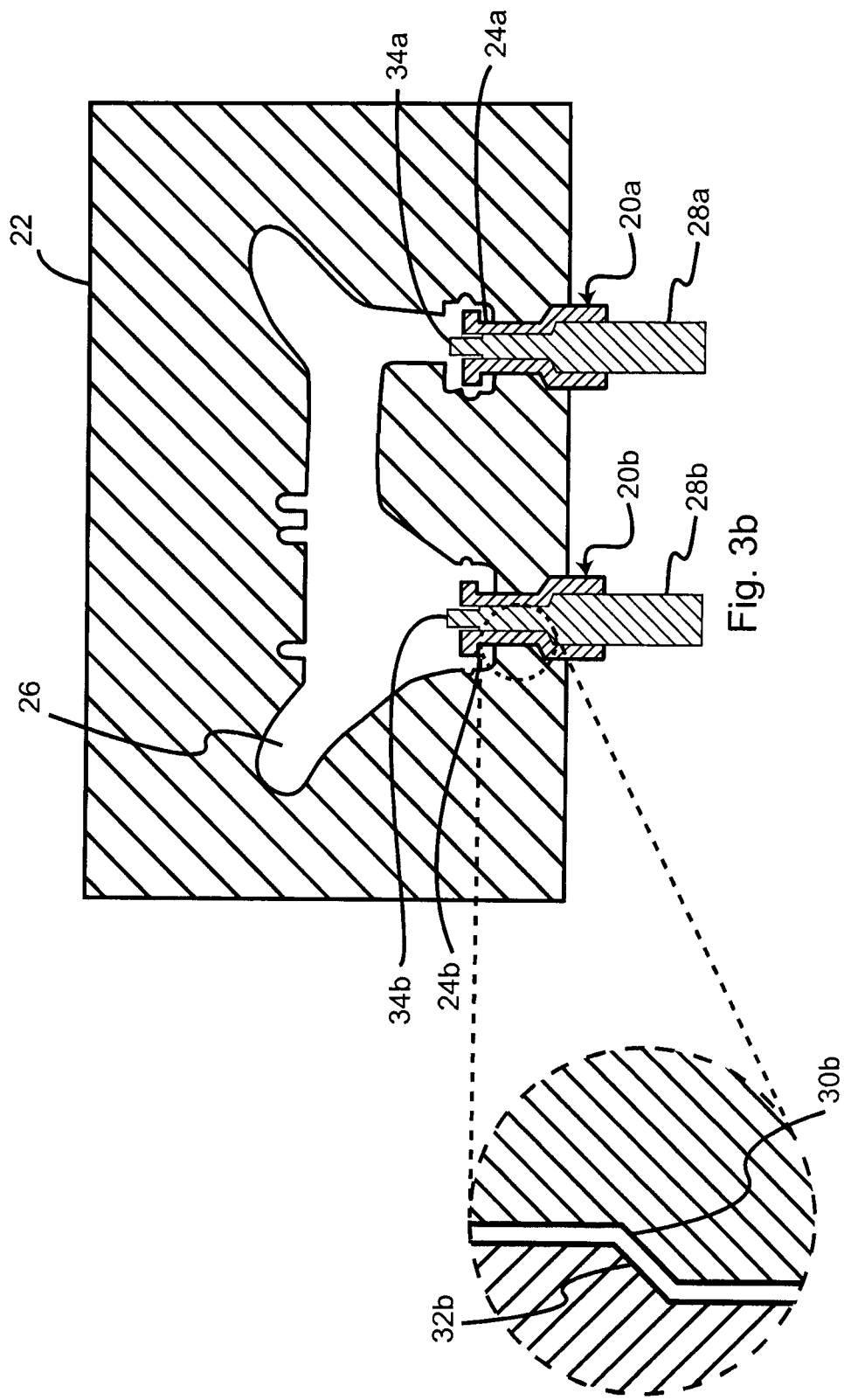
FIG. 3b is a cross-sectional view illustrating the casting of an end member around two cross-member stubs, each of the cross-member stubs being shown with one end held in a mold and with a core sealingly received therein.

Referring also to FIG. 3b, a first core 28a is inserted into the first stub 20a and a second core 28b is inserted into the second stub 20b, such that a sealing shoulder (core-associated sealing shoulder, e.g., item 30b in the inset) that is defined along an exterior surface of the cores 28a and 28b sealingly engages a sealing shoulder (stub-associated sealing shoulder, e.g., item 32b in the inset) defined along the interior surface of the first and second stubs 20a and 20b.

Figure 3C:
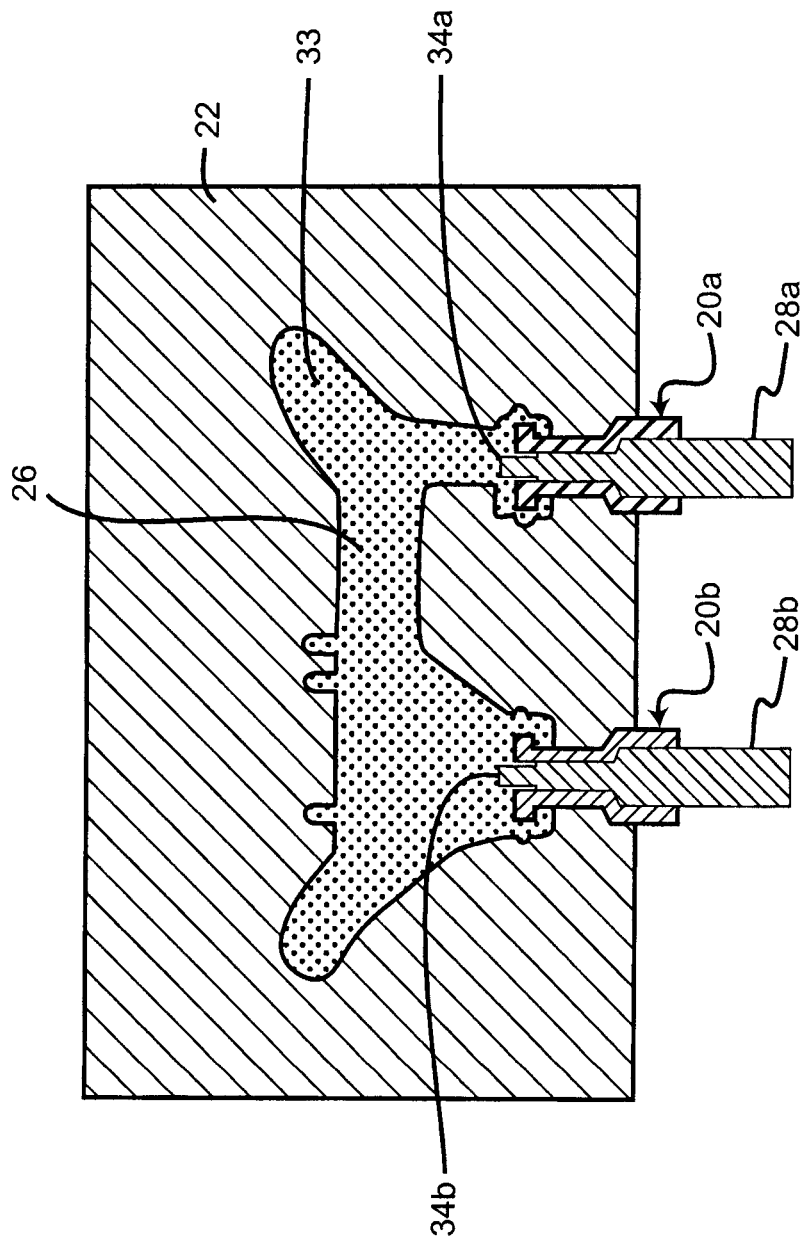
FIG. 3c is a cross-sectional view illustrating the casting of an end member around two cross-member stubs, each of the cross-member stubs being shown with one end held in a mold and with a core sealingly received therein, and the mold cavity filled with the end-member material in molten form.

Referring now to FIG. 3b and FIG. 3c, with the first and second cores 28a and 28b in place the molten first material 33 (e.g., molten aluminum or aluminum alloy) is introduced into the mold cavity 26. In the case of a semi-automated or fully-automated application, a force is provided such as by using a not illustrated hydraulic ram for urging the core 28a and 28b against the sealing shoulder on the first and second stubs 20a and 20b, respectively. While the force is being applied to the cores 28a and 28b, the molten first material 33 is prevented from escaping through the space between the core 28a and 28b and the first and second stubs 20a and 20b. Alternatively, in a manual application the cores 28a and 28b and the first and second stubs 20a and 20b are held in place by a backing part that is associated with the mold 22. In other words, when the first material 33 is introduced into the mold cavity 26 under pressure, the cores 28a and 28b and the first and second stubs 20a and 20b are pressed against the backing part, such that they are substantially prevented from moving. It will be noted that the fluid pressure of the first material 33 in the mold cavity 26 can be relatively high in order to thoroughly pack the mold cavity 26, however, the presence of the cores 28a and 28b prevents the ends 24a and 24b of the stubs 20a and 20b from collapsing. The cores 28a and 28b may themselves be solid (i.e., not hollow), at least within a portion thereof that supports the ends 24a and 24b, so as to help support the ends 24a and 24b of the stubs 20a and 20b, respectively, against collapse.

As is shown in FIGS. 3b and 3c, the cores 28a and 28b include a feature proximate the end 34a and 34b, respectively, which allows some of the molten first material 33 to support the inside of the stubs 20a and 20b, respectively. In this way, the first material 33 is cast around the inner and outer surfaces of the ends 24a and 24b of the stubs 20a and 20b, respectively.

Figure 3D:
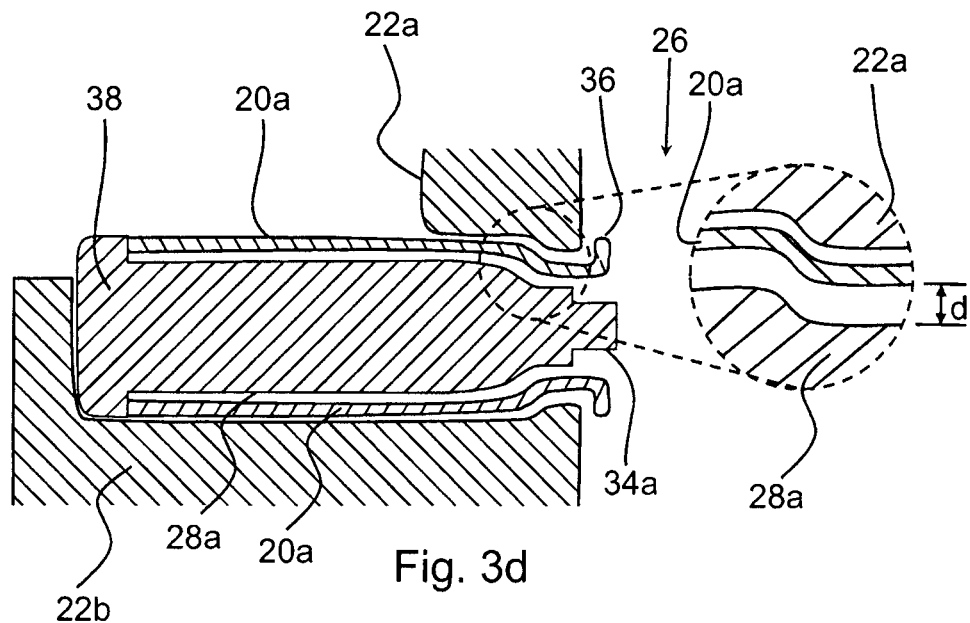
FIG. 3d is an enlarged cross-sectional view showing a slip-fit clearance "d" between the outer surface of the core and the inner surface of the cross-member stub prior to closing a mold, in an embodiment having core-associated and stub-associated sealing shoulders.

Referring now to FIG. 3d, shown is an enlarged cross-sectional view showing the cross-member stub 20a located between an upper die 22a and a lower die 22b of the mold 22, with the core 28a inserted in place within the cross-member stub 20a. There is a slip-fit clearance "d" between the outer surface of the core 28a and the inner surface of the cross-member stub 20a prior to closing the mold 22, as shown in the inset. The slip-fit clearance "d" enables insertion of the core 28a into the cross-member stub 20a. A circumferential flange 38 is provided around one end of the core 28a for locating the core 28a within the cross-member stub 20a. Further, in this specific and non-limiting example the lower die 22b includes a backing part for retaining the core 28a and cross-member stub 20a when the molten first material is introduced into the mold under high pressure. Similarly, the cross-member stub 20b includes a circumferential flange for locating the core 28b within the cross-member stub 20b. Also similarly, the core 28b and the cross-member stub 20b are retained during the casting process due to the presence of a backing part of the lower die 22b, which is located proximate the end of the core 28b and cross-member stub 20b that protrudes from the mold 22.

Figure 3E:
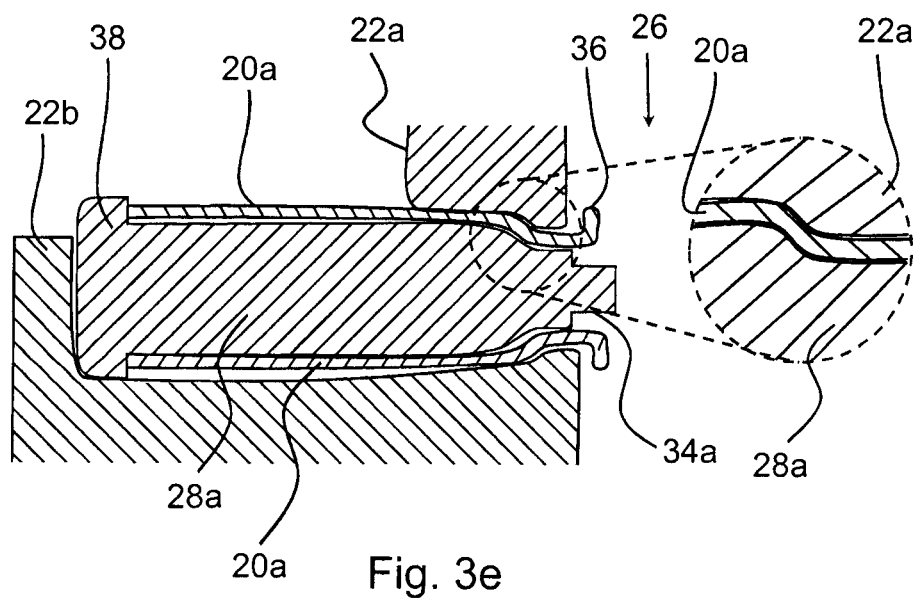
FIG. 3e is an enlarged cross-sectional view showing a friction-fit between the outer surface of the core and the inner surface of the cross-member stub subsequent to closing the mold, in the embodiment having core-associated and stub-associated sealing shoulders.

Referring now to FIG. 3e, when the mold 22 is closed the ductility of the material that is used to form the cross-member stub 20a allows the end 24a to deform slightly, such that an interference fit is created between the end 24a of the cross-member stub 20a and the core 28a. The resulting interference fit substantially prevents molten first material 33 from being ejected from the mold cavity 26 through the space between the outer surface of the core 28a and the inner surface of the cross-member stub 20a. Of course, an interference fit is created between the cross-member stub 20b and the core 28b in substantially the same way. The feature proximate the end 34a of the core 28a allows molten first material to support the inner side of the cross-member stub 20a, such that in the finished bi-metallic joint the first material surrounds the end 24a of the cross-member stub 20a, including the optional flange feature 36. When slots or holes are provided through the wall material proximate the end 24a of the cross-member stub 20a, the feature proximate the end 34a of the core 28a allows the molten first material to flow around the inner and outer surface of the end 24a of the cross-member stub 20a and through the provided slots or holes between the inner and outer surfaces.

Figure 3F:
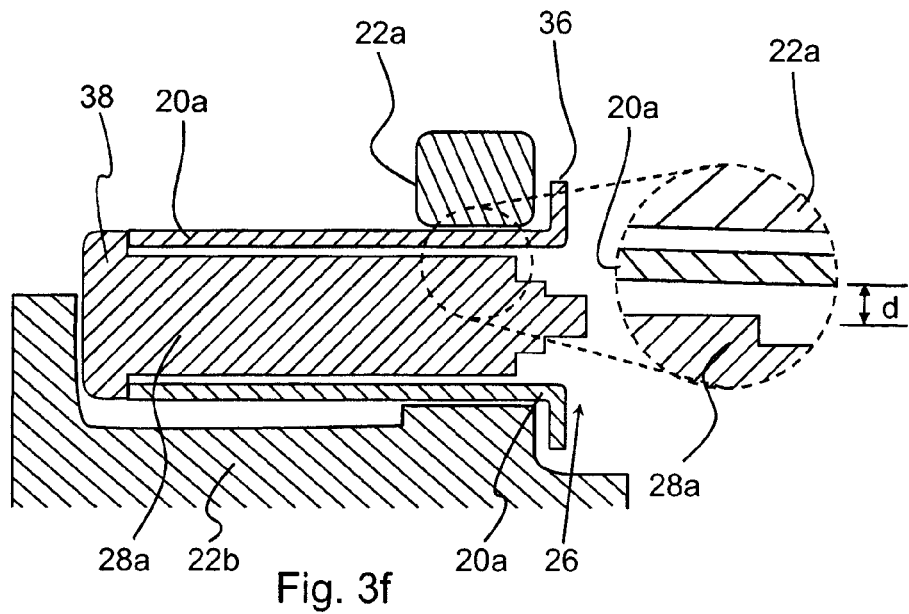
FIG. 3f is an enlarged cross-sectional view showing a slip-fit clearance "d" between the outer surface of a core and the inner surface of a cross-member stub prior to closing a mold, in an embodiment absent core-associated and stub-associated sealing shoulders.

Referring now to FIG. 3f, shown is an enlarged cross-sectional view showing the cross-member stub 20a located between an upper die 22a and a lower die 22b of the mold 22, with the core 28a inserted in place within the cross-member stub 20a. FIG. 3f illustrates an optional embodiment in which the core-associated and stub-associated sealing shoulders are absent. There is a slip-fit clearance "d" between the outer surface of the core 28a and the inner surface of the cross-member stub 20a prior to closing the mold 22. The slip-fit clearance "d" enables insertion of the core 28a into the cross-member stub 20a. A circumferential flange 38 is provided around one end of the core 28a for locating the core 28a within the cross-member stub 20a. Further, in this specific and non-limiting example the lower die 22b includes a backing part for retaining the core 28a and cross-member stub 20a when the molten first material is introduced into the mold under high pressure. Similarly, the cross-member stub 20b includes a circumferential flange for locating the core 28b within the cross-member stub 20b. Also similarly, the core 28b and the cross-member stub 20b are retained during the casting process due to the presence of a backing part of the lower die 22b, which is located proximate the end of the core 28b and cross-member stub 20b that protrudes from the mold 22.

Figure 3G:
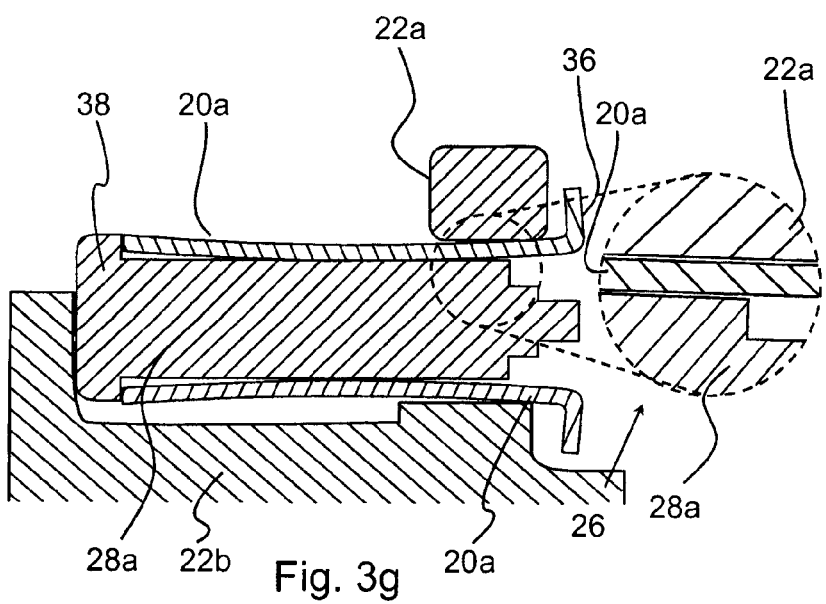
FIG. 3g is an enlarged cross-sectional view showing a friction-fit between the outer surface of the core and the inner surface of the cross-member stub subsequent to closing the mold, in the embodiment absent core-associated and stub-associated sealing shoulders.

Referring now to FIG. 3g, when the mold is closed the ductility of the material that is used to form the cross-member stub 20a allows the end thereof to deform slightly, such that an interference fit is created between the end of the cross-member stub 20a and the core 28a. The resulting interference fit substantially prevents molten first material 33 from being ejected from the mold cavity 26 through the space between the outer surface of the core and the inner surface of the cross-member stub, even though the core-associated and stub-associated sealing shoulders are absent. Of course, an interference fit is created between the cross-member stub 20b and the core 28b in substantially the same way. The feature proximate the end 34a of the core 28a allows molten first material to support the inner side of the cross-member stub 20a, such that in the finished bi-metallic joint the first material surrounds the end 24a of the cross-member stub 20a, including the optional flange feature 36. When slots or holes are provided through the end 24a of the cross-member stub 20a, the feature proximate the end 34a of the core 28a allows the molten first material to flow around the inner and outer surface of the end 24a of the cross-member stub 20a and through the provided slots or holes between the inner and outer surfaces.

Referring again to FIG. 3c, after the mold cavity 26 is sufficiently packed with the first material the mold cavity 26 is cooled in order to solidify the first material and thereby form the end member 18 around the ends 24a and 24b of the stubs 20a and 20b, respectively. Once the end member 18 is solidified, the cores 28a and 28b are removed from the stubs 20a and 20b and the mold 22 is opened, so as to release the half-cradle 12a. Optionally, the cores 28a and 28b are coated with a suitable coating that facilitates their removal from the solidified first material.

As is shown in FIG. 3c, the cores 28a and 28b have an end 34a and 34b, respectively, that may optionally extend beyond the ends 24a and 24b of the stubs 20a and 20b, respectively, into the mold cavity 26. As a result, the cores 28a and 28b create hollow portions in the end member 18 that would otherwise be filled with first material 33, which makes for a lighter half-cradle 12a than would otherwise be created with a core that did not extend into the mold cavity beyond the end of the stubs 20a and 20b.

Because the cores 28a and 28b occupy the interior volumes of the stubs 20a and 20b, respectively, the stubs 20a and 20b are prevented from collapsing inwardly under the influence of the pressure of the molten first material 33 in the mold cavity 26. As a result, the stubs 20a and 20b do not need to have a shape that is particularly suited to inhibiting collapse, and can instead have a shape that is suited to resist the stresses that will be incurred during its use in the vehicle. For example, the stub 20a may have a rectangular shape, wherein the stub 20a has a height that is larger than its width. Alternatively, the stubs 20a and/or 20b are formed with a different cross-sectional shape such as for instance the shape of a hexagon, an octagon, another polygon, an oval, or an L-shape, etc. As a result, in the instant example the stub 20a can be joined with the cross-member 14a, which has a similar rectangular shape, and also has a height that is larger than its width. The shape of the stub 20a and cross-member 14a (having a height larger than the width) makes them particularly suited to resist vertically oriented loads while maintaining relatively low weight. By contrast, the ends of cross-members used in cradles of the prior art are typically cylindrical so as to make them resistant to collapse during manufacturing, which unfortunately restricts the capability to configure them to resist the stresses incurred during their use in the vehicle. The prior art approach to overcome this limitation has been to use greater wall thicknesses, or to use more costly materials. Alternatively, if greater weight and/or cost are not tolerable, then the prior art approach is to permit higher stresses, which can negatively impact the performance and/or operating life of the cradle.

The process that is described above may be repeated as desired so as to produce additional half-cradles 12a. Of course, FIGS. 3a-c depict the manufacture of only the first half cradle 12a. It should be noted that substantially the same process is used to manufacture the second half-cradle 12b.

Figure 4A:
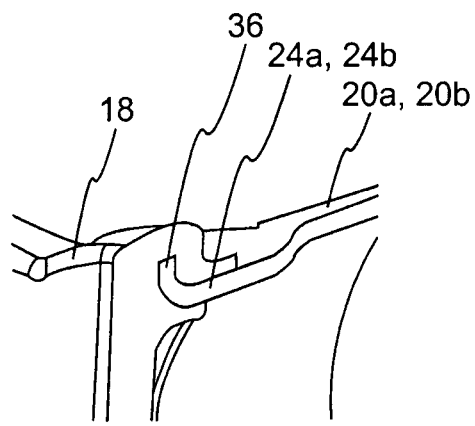
FIG. 4a is a cross-sectional view showing an optional end-feature at one end of a cross-member stub.
Figure 4B:
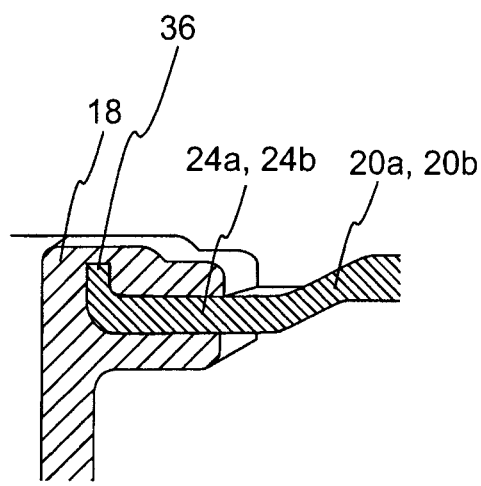
FIG. 4b is a cross-sectional view showing another optional end-feature at one end of a cross-member stub.

Referring now to FIGS. 4a and 4b, optionally an end feature 36 is provided at the ends 24a and 24b of the stubs 20a and 20b, around which ends the end member 18 is cast. For example, the end feature 36 shown in FIG. 4a is a flange that extends radially outwardly from the wall of the stubs 20a and 20b. As another example, the end feature 36 shown in FIG. 4b is an "anchor," wherein the diameter of the stubs 20a and 20b reduces and then extends out at a 90° flange at the joint.

Figure 4C:
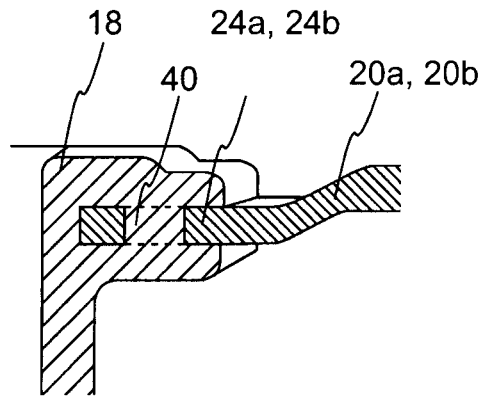
FIG. 4c is a cross-sectional view showing another optional end-feature at one end of a cross-member stub.

Referring to FIG. 4c, optionally a slot or hole 40 is provided at the ends 24a and 24b of the stubs 20a and 20b, respectively, around which ends the end member 18 is cast. When the slot or hole 40 is provided through the wall material proximate the ends 24a and 24b of the stubs 20a and 20b, respectively, the molten first material is able to flow around the inner and outer surface of the ends 24a and 24b and through the slot or hole 40, thereby forming a "pin" structure that is integral with the end member 18. The formed "pin" structure prevents both longitudinal and rotational movement of the cast end member 18 relative to the stubs 20a and 20b.

Figure 4D:
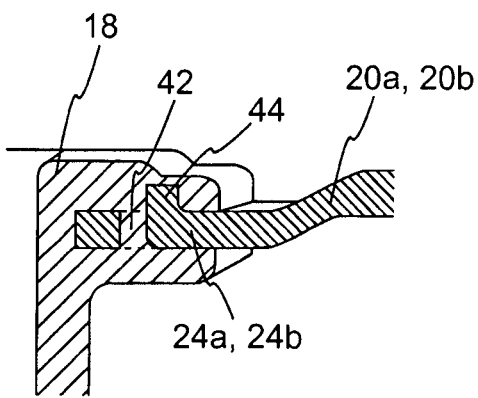
FIG. 4d is a cross-sectional view showing another optional end-feature at one end of a cross-member stub.

Referring to FIG. 4d, optionally a slot or hole 42 with a hanging slug 44 is provided at the ends 24a and 24b of the stubs 20a and 20b, respectively, around which ends the end member 18 is cast. When the slot or hole 42 with the hanging slug 44 is provided through the wall material proximate the ends 24a and 24b of the stubs 20a and 20b, respectively, the molten first material flows around the inner and outer surface of the ends 24a and 24b and through the slot or hole 40, thereby forming a "pin" structure that is integral with the end member 18. The formed "pin" structure prevents both longitudinal and rotational movement of the cast end member 18 relative to the stubs 20a and 20b. In addition, the hanging slug 44 provides an additional anti-rotation feature, thereby further reinforcing the bi-metallic joint.

Figure 5:
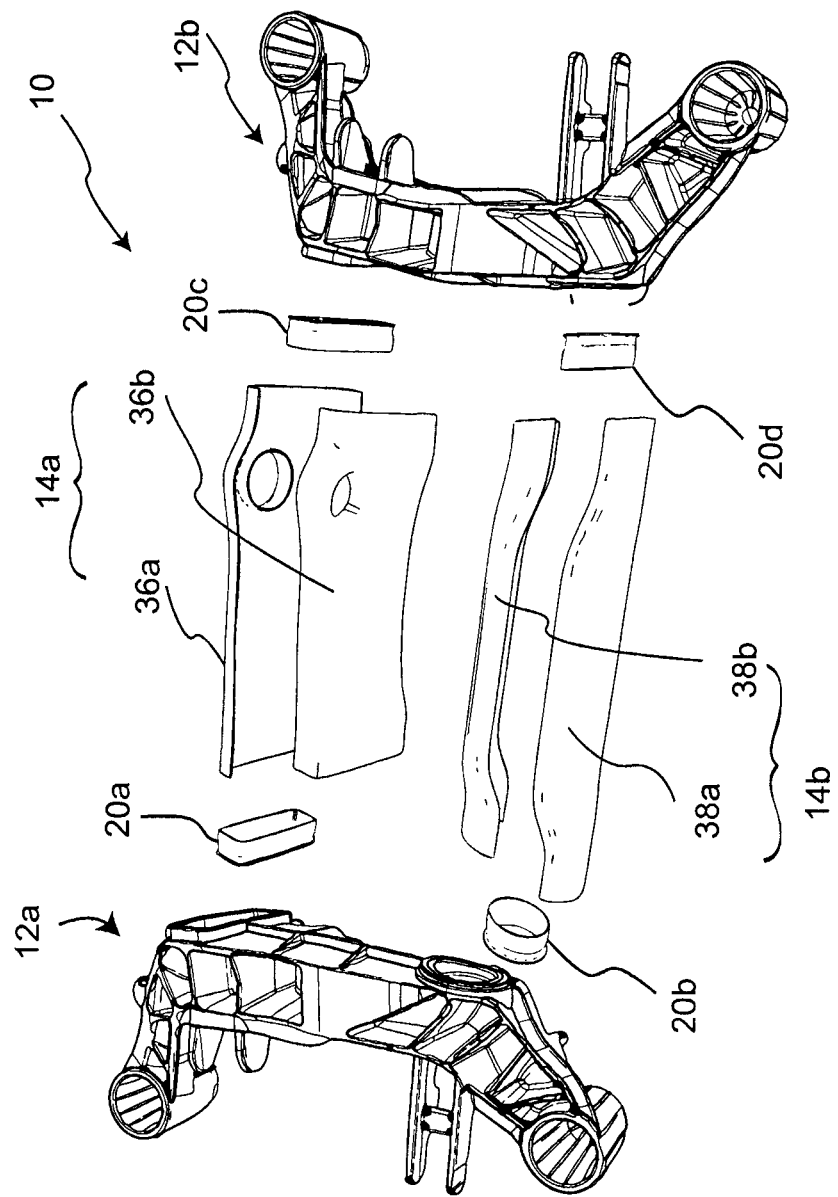
FIG. 5 shows an exploded perspective view of the cradle shown in FIG. 1.

Reference is now made to FIG. 5, which shows an exploded view of the cradle 10 of FIG. 1. The cross-members 14a and 14b may be formed any suitable way. For example, one or both cross-members 14a and 14b are made from a plurality of cross-member pieces. In the embodiment shown in FIG. 5, the first cross-member 14a is made from first and second cross-member pieces 36a and 36b, and the second cross-member 14b is made from first and second cross-member pieces 38a and 38b. The cross-member pieces 36a and 36b may be joined together (e.g., a fusion, mechanical or chemical joining, such as for instance one of welding, bolting, riveting, using an adhesive, etc.), and may be joined (e.g., a fusion, mechanical or chemical joining, such as for instance one of welding, bolting, riveting, using an adhesive, etc.) to the stub 20a on the half-cradle 12a and to the stub 20c on the half-cradle 12b. Similarly, the cross-member pieces 38a and 38b may be joined (e.g., a fusion, mechanical or chemical joining, such as for instance one of welding, bolting, riveting, using an adhesive, etc.) together and may be joined (e.g., a fusion, mechanical or chemical joining, such as for instance one of welding, bolting, riveting, using an adhesive, etc.) to the stub 20b on the half-cradle 12a and to the stub 20d on the half-cradle 12b. The cross-member pieces 36a and 36b, and the cross member pieces 38a and 38b, may be made by any suitable means, such as for instance by stamping or by roll forming. Stamping a cross-member from sheet metal may be preferable to manufacturing a cross-member from a tubular blank for several reasons, including, for example, manufacturing cost, improved design flexibility etc. Optionally, the cross-members 14a and/or 14b are formed using a traditional hydroforming process.

Because the cores 28a and 28b are used to seal against leakage of molten first material 33 during the casting process, the cross-members 14a and 14b need not be welded to the stubs 20 using continuous welds. In other words, the welds themselves are not needed to seal against leakage.

It will be noted that when casting end members around cross-members with end caps in prior art cradles, the pressure imbalance between the molten first material 33 in the mold cavity 26 and the interior of the cross-member urges the cross-member to move outwardly, unless the cross-member happens to have a shape that locks it in place against the pressure imbalance. Specialized locking mechanisms are otherwise needed to hold the cross-member in place against the pressure imbalance. Such mechanisms may be difficult to provide for some cross-members that have a shape that does not lend itself easily to being held against the pressure imbalance. By providing the stubs 20a and 20b with the sealing shoulders 32a and 32b, respectively, the cores 28a and 28b can hold the stubs 20a and 20b, respectively, in position against the pressure imbalance and thereby eliminate the need for the aforementioned specialized locking mechanisms. When the sealing shoulders are absent, an interference fit between the cores 28a and 28b and the stubs 20a and 20b, respectively, holds the stubs 20a and 20b in place.

After the first and second half-cradles 12a and 12b, respectively, are formed they may be sent to a station for X-ray scanning to verify the integrity of the cast end member 18. If the X-ray scan reveals that there are defects (e.g., large voids) in the end member 18 of one of the half-cradles, then that half-cradle can be scrapped and the other half-cradle can still be used. This is in contrast to a situation where a traditionally manufactured full-cradle is X-rayed and, when a defect is found in one of the end members, the entire full-cradle is scrapped. By forming the half-cradles 12a and 12b with the stubs 20a and 20b to provide a place for connection to the cross-members 14a and 14b, each end member 18 can be scanned individually and scrapped individually if it is found to be defective.

Furthermore, it is easier to X-ray half-cradles individually since fewer parts are present. Thus, it is less likely that the cross-members and/or the second end member will obstruct the X-ray scanning machine from having a clear view through the cast end member that is being X-rayed.

The half-cradles 12a and 12b may also be transported to other stations during the manufacturing process, for operations such as cleaning and aging/heat treatment, etc. Additionally, the half-cradles 12a and 12b may be transferred to and stored in buffer zones during the manufacturing processing between different processing steps. Transporting and handling the half-cradles 12a and 12b is relatively easier (particularly in situations where they are handled manually by an operator) due to their relative lightness compared to a full cradle. Additionally, storage of half-cradles 12a and 12b takes up less space than storage of full cradles, as there is relatively little open space in the footprint of a half-cradle, whereas there is a significant amount of open space in the footprint of a full cradle (e.g., the open space within the rectangle that is formed by the end members and cross-members).

Manufacturing half-cradles 12a and 12b using stubs 20a and 20b can be carried out on smaller presses than is possible when manufacturing full cradles, where both end members are formed simultaneously. Furthermore, the smaller presses use a one-shot tip and have simplified metal delivery to the mold cavity (which may be referred to as the crucible) as compared to the presses used to manufacture full cradles. Furthermore, the robots and mold plates associated with the smaller presses may carry out movements more quickly than is possible on larger presses for full cradles.

In addition, the half-cradles 12a and 12b can undergo a T6 treatment without creating gaps at the joints between the stubs 20a and 20b and the end member 18. A T6 treatment involves solution heat-treating the half-cradle and then artificially aging it to modify the properties of the aluminum. On the other hand, in some traditionally manufactured full cradles, a T6 treatment results in loose joints between the cross-members and the end members. It is theorized that the likelihood of improved joint integrity in the half-cradles 12a and 12b is provided at least in part by the elimination of the end caps that are used in the prior art full cradle manufacture.

At stations where a machining step is carried out, in some situations it may be possible to carry out the machining on the half-cradles 12a and 12b prior to joining the cross-members 14a and 14b to them. In such situations, the machines that carry out the machining may be smaller for handling the half-cradle 12a and 12b than they would otherwise have to be for handling a full cradle.

Prior to connection to the half-cradles 12a and 12b, the cross-members 14a and 14b in some embodiments of the instant invention receive an e-coating, wherein they are dipped in a vessel containing a coating, and are electrified to promote adhesion of the coating to their surface. After removal from the vessel containing the coating, the cross-members 14a and 14b are emptied of any excess coating that remains captured inside. In prior art cross-members, where end caps are provided at the two ends, the end caps create aperture-less end sections that can interfere with the e-coating process in several ways. One problem with the presence of the aperture-less end sections is that if the cross-member is immersed in the coating in certain orientations, it is possible to wind up with an air pocket trapped at one of the end sections, which can prevent the end section from being coated. Another problem with the end sections is that when the cross-member is removed from the vessel containing the coating, it may be difficult to drain the excess coating from the end sections of the cross-member.

By providing cross-members 14a and 14b without end caps the aforementioned problems are mitigated. Providing open (i.e., uncapped) ends at each end of the cross-members 14a and 14b substantially prevents the potential for air pockets to become trapped at one of the ends. Additionally, the open ends facilitate the drainage of any excess coating.

Finite element analysis results for the end members of a prior art cradle and of a cradle made in accordance with an embodiment of the present invention, and for the cross-members of a prior art cradle and of a cradle made in accordance with an embodiment of the present invention, indicate that the cradle 10 has a lower stress profile than the prior art cradle with which it was compared in the stress analysis. Furthermore, a weight savings was achieved with the cradle 10 relative to the prior art cradle.

While the cradle 10 that is shown in FIGS. 1-5 is a rear cradle, it will be understood that the concept of providing half-cradles with stubs and with no end caps (or with relatively thin end caps) may also be applied to a front cradle for a vehicle.

Described above are examples of bi-metallic joints as used in a cradle for a vehicle. It will be understood that the bi-metallic joints contemplated in this application can be used in many other applications, such as in the frame of a vehicle, on a twist axle for a vehicle, to form a control arm, to form a vehicular body door pillar (eg. an A-pillar or a B-pillar), to form an instrument panel support, to form a bumper assembly, and in a variety of non-automotive and non-vehicular applications.

Figure 6:
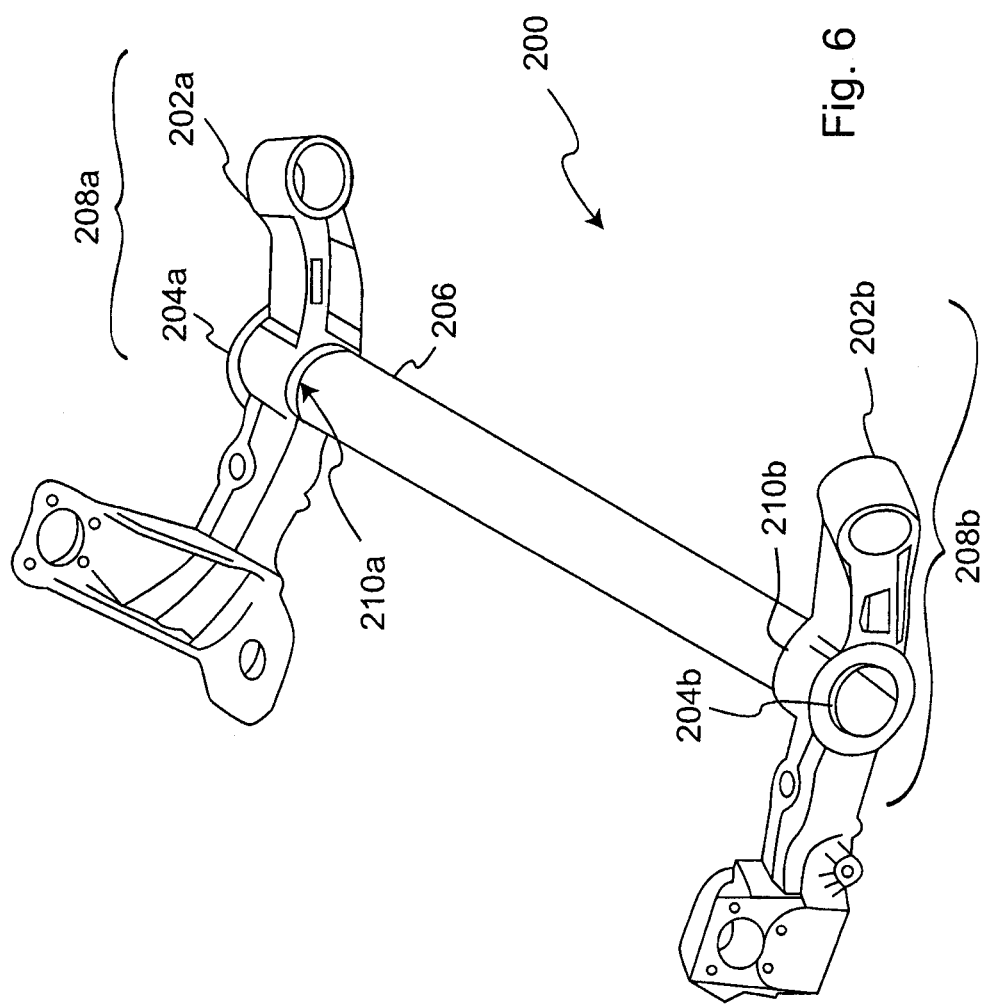
FIG. 6 is a perspective view of a torsion beam axle assembly according to an embodiment of the instant invention.

Referring now to FIG. 6, shown is an exemplary torsion beam axle assembly 200 according to an embodiment of the instant invention. The assembly 200 includes first and second end assemblies, which are shown individually at 208a and 208b, respectively, and a twist beam 206. End assembly 208a includes a bi-metallic joint 210a that is formed by casting a trailing arm 202a around one end of a twist beam stub 204a. Similarly, end assembly 208b includes a bi-metallic joint 210b that is formed by casting a trailing arm 202b around one end of a twist beam stub 204b. In a process that is similar to the process described above with reference to FIGS. 3a-c, the one end of the twist beam stub 204a is held in a not illustrated mold having a cavity that is shaped for forming the trailing arm 202a and the one end of the twist beam stub 204b is held in a not illustrated mold having a cavity that is shaped for forming the trailing arm 202b. A not illustrated core is sealingly received with the twist beam stubs 204a and 204b, and the trailing arms 202a and 202b are cast around the ends of the twist beam stubs 204a and 204b, respectively, by introducing molten casting material into the not illustrated molds. After the molten material has cooled and hardened, the not illustrated molds are opened and the end assemblies 208a and 208b are released. Subsequently, opposite ends of the twist beam 206 are inserted into the twist beam stubs 204a and 204b, and the twist beam 206 is joined to the twist beam stubs 204a and 204b (e.g., a fusion, mechanical or chemical joining, such as for instance one of welding, bolting, riveting, using an adhesive, etc.).

Figure 7:
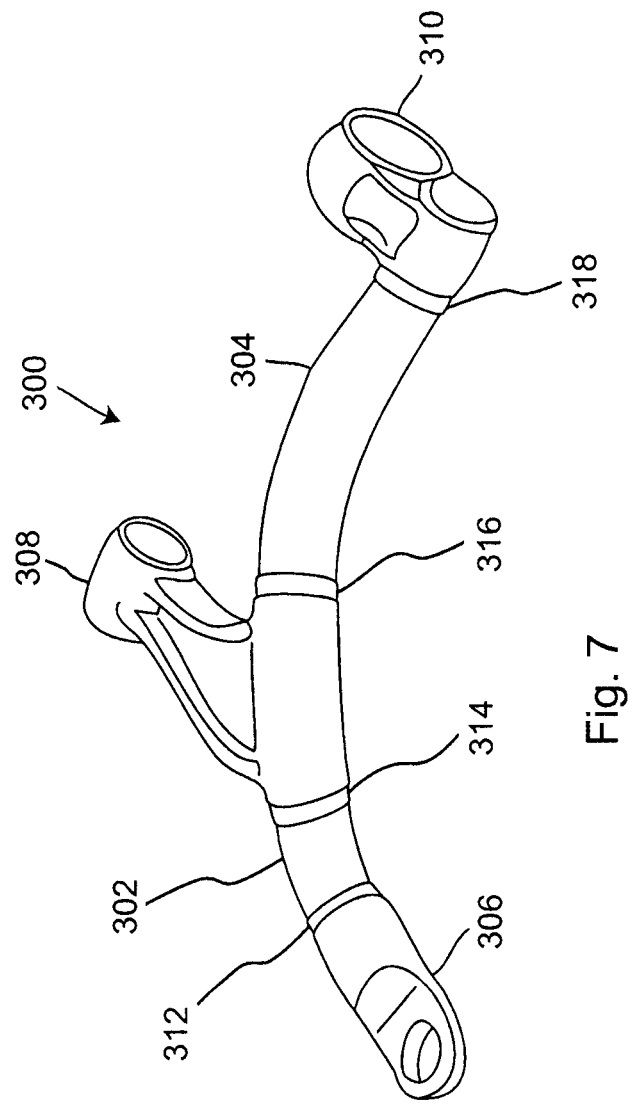
FIG. 7 is a perspective view of a control arm according to an embodiment of the instant invention.

Referring now to FIG. 7, shown is an exemplary control arm 300 according to an embodiment of the instant invention. The control arm 300 includes first and second tubular connector members 302 and 304, and cast members 306, 308 and 310. The cast member 306 is cast about one end of a stub member 312, the cast member 308 is cast about one end of each of stub members 314 and 316, and the cast member 310 is cast about one end of stub member 318. In particular, a removable core is sealingly received within the stub member 312 when cast member 306 is cast about the one end thereof, a removable core is sealingly received within each one of the stub members 314 and 316 when the cast member 310 is cast about the respective one ends thereof, and a removable core is sealingly received within the stub member 318 when cast member 310 is cast about the one end thereof. Opposite ends of the tubular connector member 302 are inserted into the stub members 312 and 314 and the tubular connector member 302 is joined to the stub members 312 and 314 (e.g., a fusion, mechanical or chemical joining, such as for instance one of welding, bolting, riveting, using an adhesive, etc.). Similarly, opposite ends of the tubular connector member 304 are inserted into the stub members 316 and 318 and the tubular connector member 304 is joined to the stub members 316 and 318 (e.g., a fusion, mechanical or chemical joining, such as for instance one of welding, bolting, riveting, using an adhesive, etc.).

Figure 8:
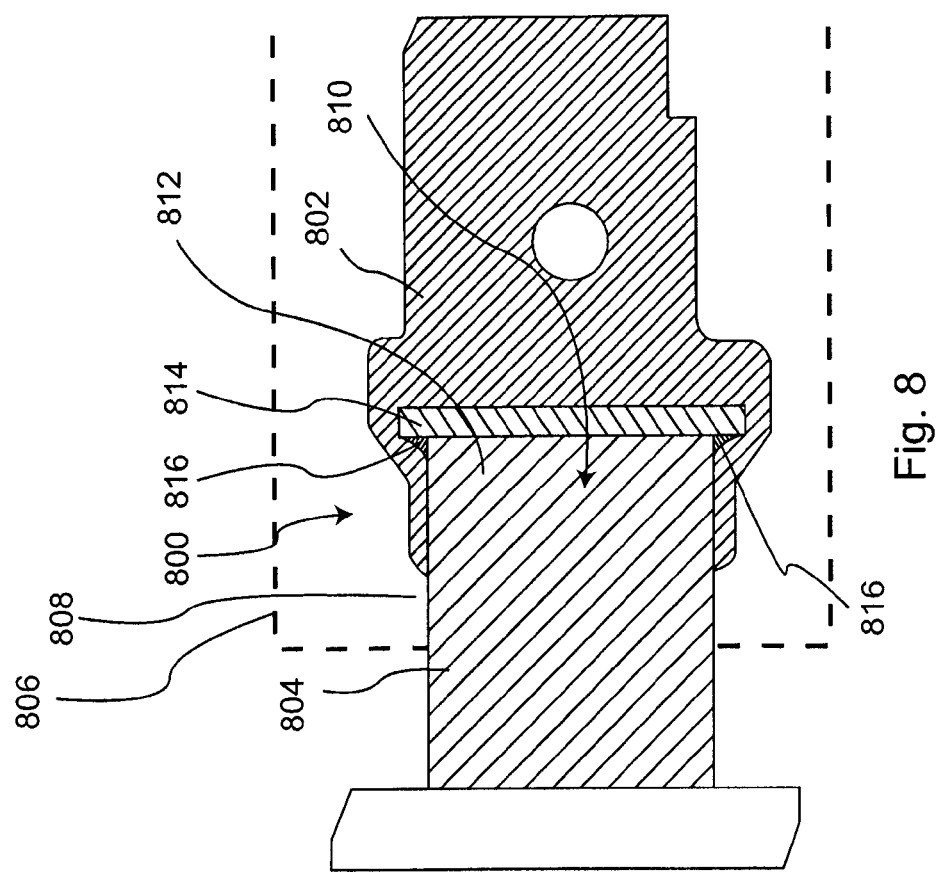
FIG. 8 is a cross-sectional view showing a bi-metallic joint according to an aspect of the instant invention.

To describe a bi-metallic joint in accordance with broader aspects of the instant invention, reference is now made to FIG. 8, which shows a bi-metallic joint 800 between a first member 802 and a second member 804. The first member 802 is cast around at least a portion of the second member 804. The first member 802 is made from a first material, such as for instance aluminum or alloys thereof, magnesium or alloys thereof, zinc or alloys thereof, or other similar materials. The second member 804 is made from a second material, such as for instance steel, aluminum or alloys thereof, copper or alloys thereof, stainless steel, etc. In particular, the melting temperature of the first material is lower than or approximately equal to the melting temperature of the second material, thereby permitting the first member 802 to be cast around the second member 804.

To form the joint 800 a portion (e.g., an end 812) of the second member 804 is positioned in a mold 806. Molten first material is introduced into the mold cavity 808 and is solidified around the portion of the second member 804 in the mold cavity, as described heretofore with reference to previous embodiments of the instant invention. In embodiments wherein the second member 804 is tubular and has an end aperture 810 at the end 812, the second member 804 may be provided with an end cap 814 that is secured to the end 812 via a weld 816, so as to prevent molten first material from escaping from the mold through the end 812. In some embodiments, wherein an end cap 814 is provided, the portion of the second member 804 in the mold cavity 808 and the end cap 814 may be configured to withstand the pressures of the molten first material in the mold. In accordance with other embodiments of the instant invention, wherein the end cap 814 and the portion of the second member in the mold are not sufficiently strong to be able to withstand the pressures in the mold by themselves, a core (not illustrated in FIG. 8) is inserted into the interior of the second member 804 and abutted with the end cap 814. In this way, the core supports the second member 804 and end cap 814 to permit them to withstand the pressures in the mold without deforming or without deforming significantly. In some embodiments, the end cap 814 is omitted entirely and the core is inserted into the interior of the second member 804 both to support the second member 804 to withstand the pressures in the mold and to seal against the escape of molten first material from the mold through the end 812. The core optionally extends into the mold farther than the second member 804 or it is positioned flush with the end of the second member 804, or the second member 804 extends into the mold farther than the core. In accordance with the embodiment in which the core extends into the mold farther than the second member, a more lightweight bi-metallic joint may be formed, since less of the first material is required to form the bi-metallic joint.

The second member 804 is for instance a stub member for being connected to another member. For example, a cradle may be fabricated with one or more second members that are stubs that are embedded partially in a cast end member (as shown in FIG. 2). Cross-members, which are made from a compatible material to the stubs, can then be welded to the stubs. For greater certainty, in embodiments wherein a cast first member has a plurality of second members partially embedded therein, it is not necessary that all of the second members be made from the same material.

In one embodiment, the second member 804 is provided with features thereon for preventing slippage and/or rotation between the first and second members during use of the joint. For example, the second member 804 is generally rectangular in cross-sectional shape (as shown in FIG. 2) to prevent rotation of the first member and second member relative to each other about an axis along the length of the second member. As another example, the second member has a flange portion thereon to prevent the first and second members from being pulled apart by forces acting on the bi-metallic joint. Anchor and/or anti-rotation features, such as for instance a flange, slots, holes, or slots/holes with hanging flaps of punched out second material optionally are provided proximate the end 812 about which the first member 802 is cast. When end cap 814 is provided at the end 812, optionally the end cap is polygonal, such as for instance hexagonal or octagonal, so as to prevent relative rotation between the first member 802 and the second member 804.

Of course, the bi-metallic joint may be used in a number of applications, such as on a twist beam axle assembly that includes a trailing arm and a twist beam, wherein the trailing arm is a first material such as cast aluminum and the twist beam is a second material such as steel, or on a cradle, such as a rear suspension cradle or an engine cradle wherein the end members are made from cast aluminum and any cross-beams are made from a first material, such as steel. Other applications for such bi-metallic joints include instrument panel support structures, automotive frames, automotive subframes, cross member rails, door beams and bumper assemblies.

After the bi-metallic joint is formed, a cross member (not shown) can be easily joined to the second member 804. Cross members can be tubes of various profiles, stampings and/or roll forms. Advantageously, the cross members can be designed from half shell members that are fastened to each other. In accordance with another advantageous embodiment of the invention, the welding of the cross member to the second member 804 does not have to be a full sealing weld.

While the above description constitutes a plurality of embodiments of the present invention, it will be appreciated that the present invention is susceptible to further modification and change without departing from the fair meaning of the accompanying claims.

What is claimed is:

1. A method of making a bi-metallic component, comprising:
 a) providing a first material;
 b) providing a tubular stub member made from a second material;
 c) positioning a portion of the tubular stub member in a mold;
 d) removably inserting a core into the tubular stub member;
 e) introducing the first material in molten form into the mold around the tubular stub member;
 f) holding the core in the tubular stub member with a force preventing the first material from filling the tubular stub member;
 g) solidifying the first material to form a cast member in the mold around a portion of the tubular stub member, the solidified cast member and the tubular stub member together forming the bi-metallic component; and
 h) opening the mold to release the bi-metallic component.

2. The method according to claim 1, wherein the first material is an aluminum alloy and the second material is steel.

3. The method according to claim 1, wherein the first material has a melting temperature that is lower than or equal to the melting temperature of the second material.

4. The method according to claim 1, wherein an end of the tubular stub member is positioned in the mold during step d) and wherein the removable core extends beyond the end of the tubular stub member and into the mold.

5. The method according to claim 1, wherein step c) includes positioning a second end of the tubular stub member in a cavity of the mold; and step d) includes inserting the core through a first end of the tubular stub member, wherein the first end of the tubular stub member is opposite the second end of the tubular stub member and positioned outside the cavity of the mold.

6. The method according to claim 5 including removing the core through the first end of the tubular stub member after step g).

7. The method according to claim 6, wherein the core is coated with a coating facilitating the removal of the core from the solidified first material.

8. The method according to claim 5 including positioning a first end of the core outwardly of the first end of the tubular stub member during step d); and wherein step e) occurs while the first end of the core is positioned outwardly of the first end of the tubular stub member.

9. The method according to claim 5, wherein first and second ends of the core extend beyond the first and second ends of the tubular stub member during step e).

10. A method of making a bi-metallic joint, comprising:
a) providing a first metal;
b) providing a second member made from a second metal, the second member having an end aperture at an end thereof;
c) sealing the end aperture with an end cap;
d) inserting a core into the second member in abutment with the end and with the end cap;
e) positioning the end of the second member in a mold;
f) introducing the first metal in molten form into the mold around the end of the second member and the end cap;
g) solidifying the first metal to form a first member in the mold around the end of the second member and the end cap; and
h) removing the core from the second member,
wherein the end cap and the end of the second member are not strong enough to withstand a pressure in the mold during steps f) and g) without deformation of at least a portion of either the end or the end cap; and
wherein the core remains in abutment with the end and with the end cap during steps f) and g) and prevents the deformation of at least a portion of either the end or the end cap during steps f) and g).

11. A method of making a bi-metallic joint, comprising:
a) providing a first metal;
b) providing a second member made from a second metal, the second member having an end aperture at an end thereof;
c) removably inserting a core into the second member through an open first end thereof, the core configured for forming a seal, during a molding process, between an outer surface thereof and an interior surface of the second member that faces the outer surface of the core;
d) positioning an open second end of the second member in a mold, the second open end opposite the first open end;
e) introducing the first metal in molten form into the mold around the second open end of the second member;
f) solidifying the first metal to form a first member in the mold around the second open end of the second member; and
g) removing the core from the second member.

* * * * *